Figure 1:
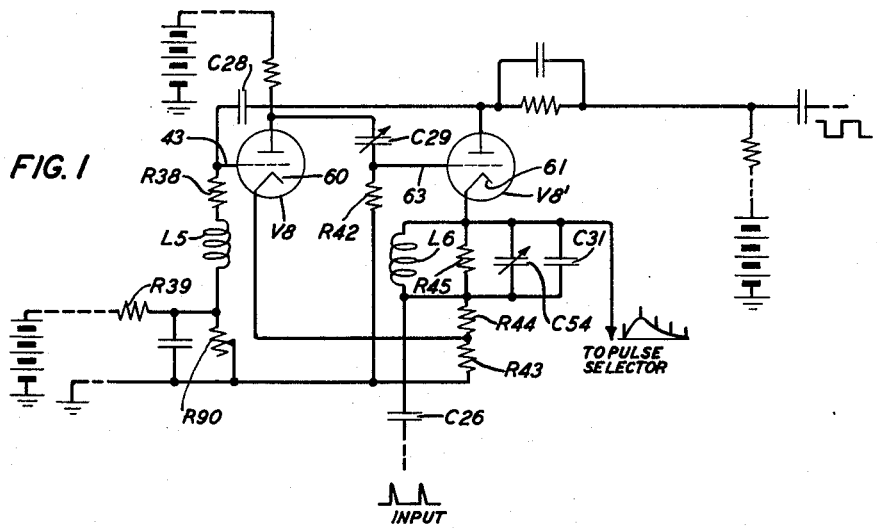

May 19, 1953 H. W. AUGUSTADT 2,639,385
ALTERNATING WAVE GENERATOR
Original Filed Sept. 5, 1947

INVENTOR
H. W. AUGUSTADT
BY
ATTORNEY

Patented May 19, 1953

2,639,385

UNITED STATES PATENT OFFICE 2,639,385

ALTERNATING WAVE GENERATOR

Herbert W. Augustadt, Westfield, N. J., assignor to Bell Telephone Laboratories, Incorporated, New York, N. Y., a corporation of New York Original application September 5, 1947, Serial No. 772,429. Divided and this application December 20, 1948, Serial No. 66,381

7 Claims. (Cl. 250—36)

This is a division of my prior application, Serial No. 772,429, filed September 5, 1947, for an improvement in Indicating Apparatus, issued as Patent No. 2,546,814, March 27, 1951.

This invention relates to electrical oscillatory systems, and more particularly to oscillators of the type generally known as relaxation oscillators.

In the type of relaxation oscillator which has become generally known as a multivibrator, current conduction occurs in only one circuit branch at any given instant. The start of current conduction in one branch gives rise to a progression of voltage pulses that momentarily reduce the potential of the control grid electrode in the conjugate branch to a relatively low negative value. In the manner that is well known in the art, this negative potential is then removed from this control grid electrode at an exponential rate. When the control grid potential has recovered, or risen, to a value that is equal to its "cut-off" value, current conduction again starts in that tube, which action gives rise to another succession of pulses that result in cutting off, or making non-conductive, the conjugate branch.

If the rising control grid potential is permitted to approach its "cut-off" value at a gradual rate of change there will be a considerable portion of the oscillatory cycle during which a relatively small change in circuit parameters, or a relatively small voltage impulse of the proper polarity, may cause premature reversal of the oscillator. This is true whether the oscillator is operating as a free-running unit, or whether it is being operated as a controlled, or "driven" unit. In this latter case, of course, it is necessary that the unwanted change or impulse occur prior to the controlling impulse that normally would cause the oscillator's reversal. It is known that this vulnerable period may be decreased by increasing the rate of change of the control grid potential during the time it is approaching its "cut-off" value. This, of course, results in the control grid potential being in the neighborhood of its "cut-off" value for a shorter time than does a more gradual change.

This present invention is directed to an improved manner and means for securing increased stability of operation of relaxation oscillators and particularly oscillators of the multivibrator type by increasing the rate of change of the grid charging voltage at a time corresponding to its "cut-off" value.

It is also an object of the invention to improve the certainty of control of relaxation oscillators when they are operated under the influence, or control, or synchronizing impulses from a controlling source.

In accordance with the present invention the stability of oscillation of the free-running oscillator, or the accuracy of control of the controlled, or driven, oscillator are greatly improved by a novel and distinctive arrangement that is employed in the interelectrode coupling circuits of the oscillator.

This novel and distinctive arrangement operates to effectively greatly decrease the slope of the grid charging voltage during its early charging period, and to greatly increase the slope of this charging voltage at a period corresponding to the "cut-off" value of the discharge device.

Figure 2:
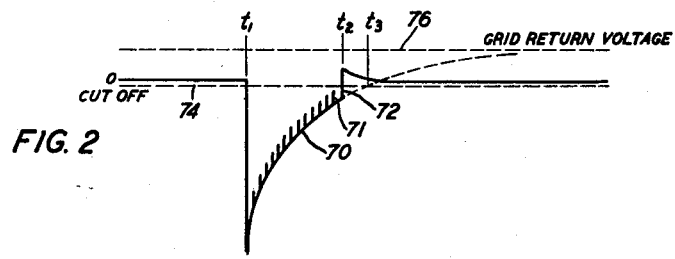
Figure 3:
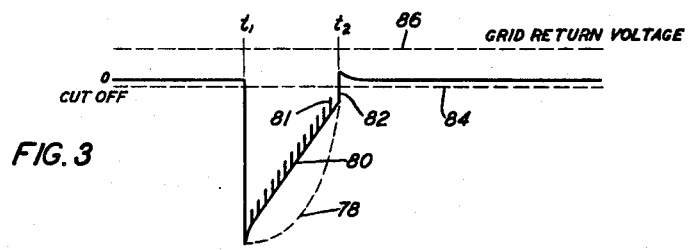

The present invention will be readily understood from the following detailed description taken together with the accompanying drawing, in which:

Fig. 1 is a circuit diagram of a multivibrator type of relaxation oscillator which is constructed in accordance with the invention; and Figs. 2 and 3 are illustrative graphs to which reference will be made in describing the operation of the oscillator of Fig. 1.

Fig. 1 shows a detailed schematic of a multivibrator type of relaxation oscillator which has been constructed in accordance with this invention. The oscillator comprises a pair of triode vacuum tubes V8, V8', each comprising a cathode, an anode and a control grid electrode. The anode of triode V8 is connected to the control grid 63 of triode V8' through coupling capacitor C29, which together with resistor R42, constitutes a differentiating network in the usual manner. The anode of triode V8' is connected to the control electrode 43 of triode V8 through coupling capacitor C28 arranged in a series resonant circuit with resistor R38 and inductor L5. The lower terminal of coil L5 is connected to a voltage divider comprising resistors R39 and R90. This divider forms a convenient means for making small adjustments in the free-running frequency of the oscillator. Cathode 61 of triode V8' is connected to ground through a voltage divider which includes resistors R43 and R44, and the cathode of triode V8 is connected to their junction. An antiresonant circuit comprising inductor L6, resistor R45 and capacitors C34 and C54 is also included in the cathode circuit of triode V8'. This antiresonant circuit performs a necessary function in the indicating circuit of my prior application, Serial No. 772,429, but it is not necessary for the practice of this invention.

and these elements will not be further considered in this description. For the purpose of this explanation it would be sufficient if the cathode of triode V8' were connected directly to the upper terminal of resistor R44. Resistor R42 is connected between control grid electrode 63 and the grounded terminal of voltage divider resistor R43. Positive voltage unidirectional impulses may be connected through capacitor C26 to the cathode end of voltage divider resistor R44 to control this multivibrator oscillator in the manner will known in the art.

With the exception of capacitor C28 and inductor L5, all of the components of the multivibrator may be chosen in accordance with well-known design considerations. Capacitor C28 and inductor L5 form a series resonant circuit, and in the optimum case are so chosen as to be resonant at a frequency slightly less than one-half of the desired controlled oscillating frequency. In this described and tested embodiment values of .01 microfarad, .1 megohm and 26 henries were used for capacitor C28, resistor R38 and inductor L5, respectively. Although these values do not exactly correspond to the previously described optimum relationship it was found that the addition of such a resonant circuit imparted a marked degree of linearity to the grid charging voltage on electrode 43 as compared to the case where the resonant arrangement was omitted. As was previously stated, adjustment of the voltage divider comprising resistors R39, R90 permits limited control of the free-running frequency of the oscillator.

The manner in which this circuit operates may be best understood from the following description. The introduction of positive voltage pulses in the cathode circuit of one of the tubes, V8 or V8', while that tube is conducting, gives rise to positive voltage pulses in the anode circuit of the respective tube. These positive voltage pulses, when impressed through coupling capacitors C28 and C29 upon the rising grid voltage of the control electrode of the conjugate tube bring about reversal of the oscillator when the combined grid potential and pulse voltage exceeds the "cut-off" voltage of the non-conducting tube. The grid voltage graph of Fig. 2 indicates this condition for a conventional multivibrator which does not include the series resonant circuit of this described unit. Referring to this figure, at time $t1$ the voltage of one control electrode has been driven negatively by the change in anode voltage of the conjugate tube. This control electrode voltage increases, or rises, at an exponential rate that is largely determined by the RC value of the coupling capacitor and its associated grid leak resistor, and by the magnitude of the grid return voltage, such as is derived from the R39, R90 voltage divider. The value of this grid return voltage is indicated by the dotted line 76. At time $t2$, pulse 72 plus the increased grid voltage is sufficient to raise the control electrode potential to a value exceeding "cut-off" which is indicated by dotted line 74. At this time current starts to flow in the previously cut off tube and quickly reaches its saturated value. If no control voltage impulses, such as pulse 72, had been superimposed upon this rising grid voltage 70, the coupling condenser would have continued to charge as an exponential function, indicated by the dotted portion of curve 70, until the control electrode voltage had, at time $t3$, equalled the "cut-off" voltage 74 to initiate current conduction in the tube. Because of the relatively slow rate of change of the rising grid voltage, as indicated by curve 70, the peak potential on the control electrode caused by pulse 71 closely approximates that caused by the reversing pulse 72. It is apparent that small changes in circuit parameters or pulse amplitudes during this critical period might cause premature circuit reversals. If the unit is operated in a free-running or uncontrolled state the likelihood of some unstable condition causing a premature reversal before time $t3$ is accordingly greater.

With the introduction of inductor L5 in series connection with the coupling capacitor C28 and resistor R38, the rate of change in the voltage on control electrode 43 is modified as is indicated by curve 80 of Fig. 3. When coupling capacitor C28 and inductor L5 are so proportioned as to be resonant at a frequency substantially less than the free-running frequency of the oscillator, the rate of change of the voltage on control electrode 43 is considerably decreased at a time immediately after time $t1$, and is considerably increased in the vicinity of the "cut-off" voltage of the tube, as indicated by dotted line 84. This condition is indicated by curve 80, and the increased linearity of this grid charging voltage may be realized when curve 80 is compared to curve 70 of Fig. 2.

This improved rate of voltage change is believed to be due to the self-inductive properties of inductor L5, by which it tends to oppose any change in the current flowing through the coil. At time $t1$ (Fig. 3), corresponding to the start of conduction in triode V8', the potential on control electrode 43 is driven negatively. Capacitor C28 immediately starts to equalize the voltage difference between its plates by discharging through inductor L5, resistors R90, R38, R43 and R44, and through the space charge path of triode V8'. At the start of this discharge period inductor L5 offers its maximum opposing electromotive force because of the high rate of change of current flow through it. As the discharging operation proceeds, the rate of change of current flow decreases, and the opposing electromotive force offered by inductor L5 also decreases. This force has its minimum value when the current flow reaches its maximum value. This permits a high rate of voltage increase on control electrode 43 in the critical "cut-off" region. If the resistance R38 were completely removed, which it well may be, and if purely reactive components were available for use in place of capacitor C28 and inductor L5, the voltage on the control electrode 43 might rise from its most negative value at time $t1$ to its "cut-off" value 84 at time $t2$ in accordance with the theoretical cosine curve 78. Because resistanceless circuit components are not realizable, the theoretical voltage increase curve 78 is not actually achieved, but the linearizing effect of inductor L5 is realized, as is indicated by the solid line curve 80. The degree of linearization that is actually realized in any specific instance may be increased or decreased by suitably changing the value of R38, even to the point of eliminating this component if it be desired.

In Fig. 2 incoming pulse 71 immediately preceded pulse 72, which pulse would cause reversal of the oscillator. The corresponding situation is indicated for the oscillator of this invention by pulses 81 and 82 of Fig. 3. By inspection it will be noted that the linearized voltage increase, as indicated by curve 80, provides considerably more margin between the maximum potential 81 and the cut-off potential 84 than is provided between the maximum potential 71 and cut-off potential 74 of the conventional oscillator. In the case of the controlled or driven oscillator this increased margin provides added certainty of synchronization.

When operating in a free-running state, the oscillator of this invention operates with considerably improved stability over that of the conventional multivibrator since the rate of change of the control grid potential is considerably increased over that of the conventional multivibrator. This means that the control electrode potential is in a vulnerable position, or a position in which it may be responsive to extraneous voltage impulses, for a shorter time than in the case of the conventional unit. From the foregoing it will be seen that the increased rate of change in the control voltage tends to minimize the effect of power source fluctuations, or the effect of extraneous voltage impulses.

Although this invention has been described in connection with a relaxation oscillator of a specific type, and certain circuit component values have been specifically enumerated, it should be realized that the invention is not limited to this specific embodiment or to such component values, since, modifications of the disclosed embodiment which are within the spirit and scope of the invention will undoubtedly occur to those skilled in the art.

What is claimed is:

1. A multivibrator oscillatory circuit comprising two thermionic discharge devices, each of said devices including an anode, a cathode and a control grid electrode, anode-cathode and control grid-cathode circuits therefor, the control grid of one of said devices being connected to the anode of said other device through the capacitive member of a resistance-capacitance time constant circuit, and the control grid of said other device being connected to the anode of said one device through the capacitive member of a serially connected inductance-capacitance circuit so proportioned as to resonate at a fraction of the frequency of operation of said multivibrator oscillatory circuit.

2. An alternating wave generator of the multivibrator type comprising a pair of thermionic discharge devices, each having an anode, a cathode and at least one control grid electrode, anode-cathode and control grid-cathode circuits therefor, the control grid of a first of said discharge devices being connected to the anode-cathode circuit of the second of said devices through the capacitive element of a serially connected resistance-capacitance timing network, the control grid electrode of said second device being connected to the anode-cathode circuit of said first device through the capacitive member of a serially arranged inductive-capacitive circuit, said circuit elements being proportioned to resonate at a frequency substantially equal to one-half of the frequency of operation of said alternating wave generator, and said inductive element being included in the control grid-cathode circuit of said second device.

3. An oscillation generator comprising a pair of thermionic discharge tubes, each comprising an anode, a cathode and a control grid electrode, an anode load resistor connected to each anode and a source of positive potential connected to each anode load resistor, a coupling capacitor connected between the anode and the control electrode respectively of a first and second of said discharge tubes, a resistor connected in the control electrode-cathode circuit of said second discharge tube, a second coupling capacitor connected between the anode of said second tube and the control electrode of said first tube and an inductor serially connected with said second capacitor and included in the control electrode-cathode circuit of said first tube, said inductor and said second coupling capacitor being so arranged as to form a series circuit with their values chosen such that said elements resonate at a frequency between one-fourth and three-fourths of the operating frequency of said oscillation generator.

4. An oscillation generator comprising a pair of thermionic discharge tubes, each comprising an anode, a cathode and a control grid electrode, an anode load resistor connected to each anode and a source of positive potential connected to each anode through said load resistor, a coupling capacitor connected between the anode and the control electrode respectively of a first and second of said discharge tubes, a resistor connected in the control electrode-cathode circuit of said second discharge tube, a second coupling capacitor connected between the anode and the control electrode respectively of said second and first discharge tubes and an inductor serially connected with said second capacitor and included in the control grid-cathode circuit of said second discharge tube, said inductor and said second coupling capacitor being of such sizes that they present opposed impedances of substantially the same magnitudes at a frequency equal to about one-half the frequency of oscillation of said oscillation generator.

5. An oscillation generator comprising a pair of thermionic discharge tubes, each comprising an anode, a cathode and a control grid electrode, a source of positive potential connected to each anode through an individual anode load resistor, a coupling capacitor connected between the anode and the control electrode respectively of a first and second of said discharge tubes, a resistor one end of which is connected to said coupling capacitor and to the control electrode of said second discharge tube, a voltage dividing resistance network having two outer terminals and an intermediate terminal, one of said outer terminals being connected to the cathode of said second discharge tube, the other of said outer terminals being connected to said control grid resistor, the cathode of said first discharge device being connected to the intermediate terminal of said resistance network, a second coupling capacitor connected between the anode of said second discharge tube and the control electrode of said first discharge tube, a series circuit comprising a resistor and an inductor, said resistor being connected to said second capacitor and to the control electrode of said first discharge tube and said inductor being connected to said voltage dividing resistance network, the magnitudes of said inductor and capacitor being so chosen that they present substantially a resistive impedance at a frequency equal to one-half the oscillating frequency of said generator.

6. An oscillation generator comprising a first and second electron discharge device each including a cathode an anode and a control grid electrode, a load resistor connected to each anode, means including said resistors to maintain said anodes at a potential positive with respect to said cathodes, a capacitor and a resistor connected in series between the anode and cathode electrodes of said first device, a capacitor and an inductor connected in series between the anode and cathode electrodes of said second device, a direct connection between the control electrode of said first device and the junction of said capacitor and inductor, a direct connection between the control electrode of said second device and the junction of said capacitor and resistor, said series-connected capacitor and inductor being of such magnitudes as to resonate at a fraction of the frequency of oscillation of said devices.

7. An oscillation generator in accordance with the preceding claim wherein said series-connected capacitor and inductor are so proportioned that they are resonant at a frequency slightly less than one-half the oscillation frequency of said devices.

HERBERT W. AUGUSTADT.

References Cited in the file of this patent

UNITED STATES PATENTS

| Number | Name | Date |
|---|---|---|
| 2,070,647 | Braaten | Feb. 16, 1937 |
| 2,419,772 | Gottier | Apr. 29, 1947 |
| 2,426,205 | Grieg et al. | Aug. 26, 1947 |
| 2,516,867 | Harris | Aug. 1, 1950 |

FOREIGN PATENTS

| Number | Country | Date |
|---|---|---|
| 415,804 | Great Britain | Sept. 6, 1934 |
| 452,583 | Great Britain | Aug. 25, 1936 |
| 583,996 | Great Britain | Jan. 3, 1947 |